United States Patent

[11] 3,597,128

| [72] | Inventors | Fredrick D. Venable;<br>Raymon L. Goff, both of Lafayette, Ind. |
|------|-----------|---|
| [21] | Appl. No. | 815,161 |
| [22] | Filed | Apr. 10, 1969 |
| [45] | Patented | Aug. 3, 1971 |
| [73] | Assignee | TRW Inc.<br>Cleveland, Ohio |

[54] HYDRAULIC DEVICE HAVING HYDRAULICALLY BALANCED COMMUTATION
16 Claims, 7 Drawing Figs.

| [52] | U.S. Cl. | 418/61 |
|------|----------|--------|
| [51] | Int. Cl. | F01c 1/02 |
| [50] | Field of Search | 91/56;<br>103/130; 230/145; 123/860 R |

[56] References Cited
UNITED STATES PATENTS

| 3,087,436 | 4/1963 | Dettlof et al. | 103/130 |
| 3,270,683 | 9/1966 | McDermott | 103/130 |
| 3,429,271 | 2/1969 | Easton | 103/130 |
| 3,443,378 | 5/1969 | Monroe et al. | 91/56 X |
| 3,453,966 | 7/1969 | Eddy | 103/130 |
| 3,473,437 | 10/1969 | Ohrberg | 91/56 |
| 3,473,438 | 10/1969 | Hansen | 91/56 |

*Primary Examiner*—Martin P. Schwadron
*Assistant Examiner*—Leslie J. Payne
*Attorney*—Hill, Sherman, Meroni, Gross & Simpson ABSTRACT: A hydraulic device including a pair of hypocycloidal gear members arranged for relative rotational and orbital movement to provide alternately expanding and contracting pockets between the teeth thereof and a commutator valve associated with said gear members for directing fluid into and out of said pockets in timed relation with the movement of said gear members. The commutator valve is constructed and arranged so as to be balanced hydraulically in an axial direction by virtue of the pressure of the fluid acting thereon.

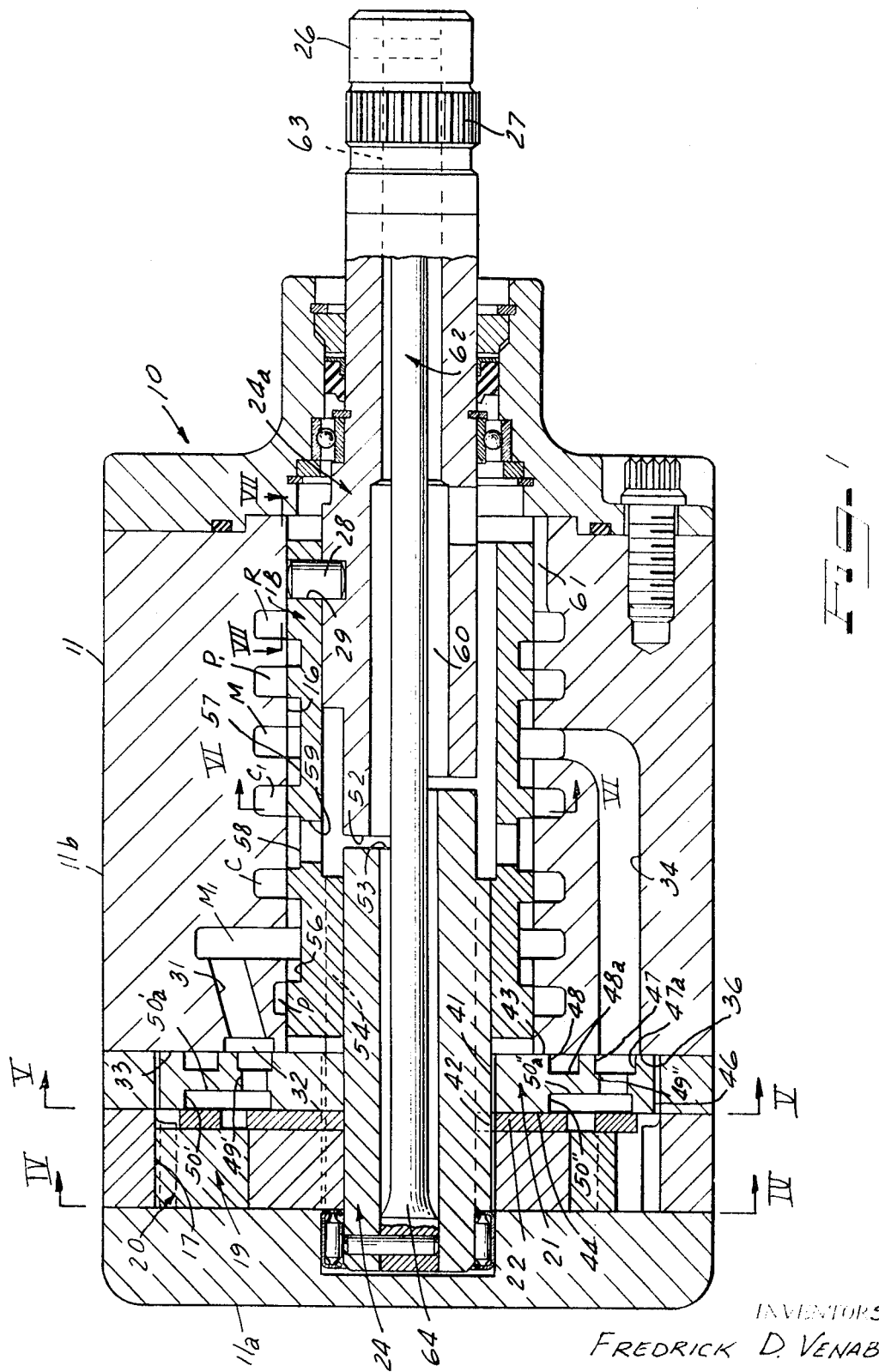

Patented Aug. 3, 1971
3,597,128
3 Sheets-Sheet 2
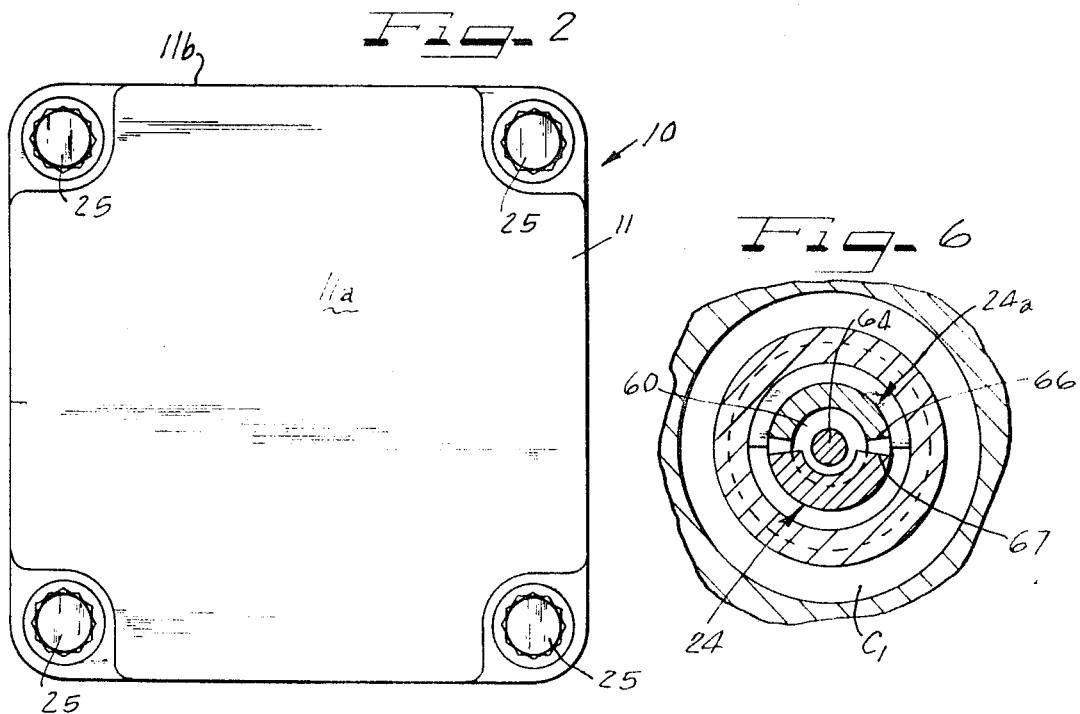
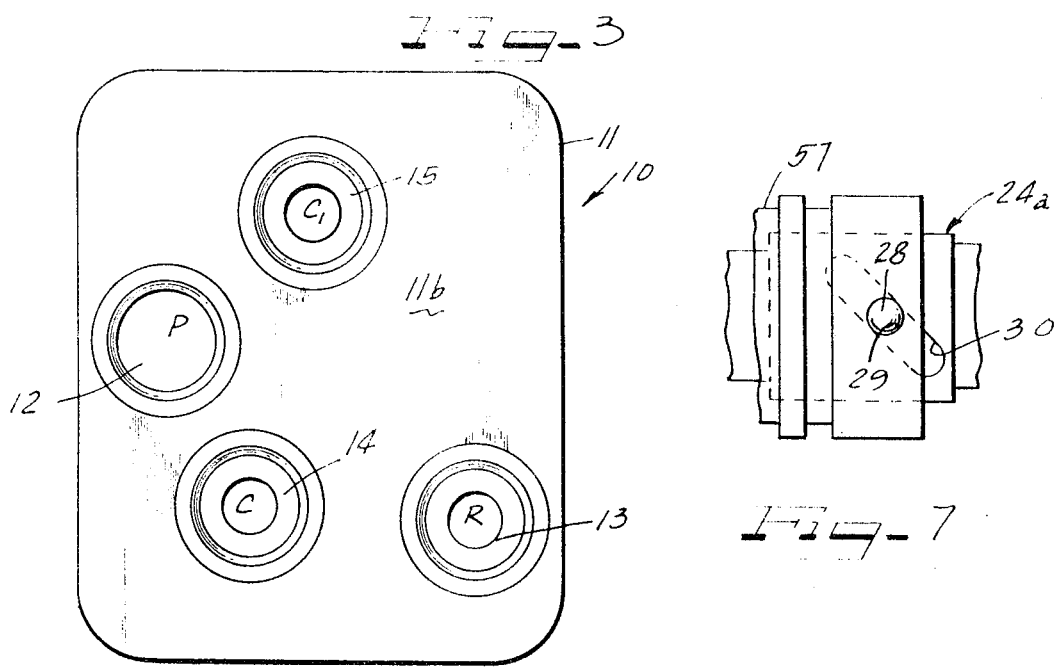
INVENTORS
FREDRICK D. VENABLE
RAYMON L. GOFF

INVENTORS
FREDRICK D. VENABLE
RAYMON L. GOFF

HYDRAULIC DEVICE HAVING HYDRAULICALLY BALANCED COMMUTATION

BACKGROUND OF THE INVENTION

This invention relates generally to the field of hydraulic devices and more particularly to such devices which include a pair of gear members, one of which is disposed within the other for movement orbitally and rotationally relative thereto to provide alternately expanding and contracting fluid chambers or pockets between the teeth thereof and which further include a valve, generally referred to as a commutator valve, associated with the gear members and movable in timed relation therewith for directing fluid into and out of the expanding and contracting pockets.

Hydraulic devices of this general description are commonly used as hydraulic pumps and motors in a variety of applications including hydraulic power steering systems and the like. Some of the advantages inherent in such devices include a high mechanical advantage coupled with closely controlled fluid flow rates.

Some such devices known in the prior art employ a commutator valve which is generally disc shaped and disposed in axially offset relation with respect to the gear members. The fluid flows axially through the valve as it is directed to and from the expanding and contracting pockets. As a result of the fluid pressures to which the valve is subjected in an axial direction, the forces acting on the valve are not balanced, thus causing wear and reducing the useful life of the valve.

The present invention solves the problem of axial imbalance in an axial flow-through commutator valve by constructing and arranging the valve in a manner such that the fluid-applied forces acting thereon are balanced in an axial direction.

SUMMARY OF THE INVENTION

The invention may be summarized as comprising a hydraulic device of the type described characterized in that it includes a commutator valve having a pair of radial walls and means including recesses formed in the walls for providing fluid communication with and for directing fluid into and out of the expanding and contracting pockets formed between the teeth of the gear members and for hydraulically balancing the valve in an axial direction.

An object of the invention is to reduce wear on the commutator valve and to increase the useful life thereof.

Another object of the invention is to increase the efficiency of the hydraulic device to which the commutator valve appertains.

Another object is to reduce the frictional force between relatively moving parts.

Many other features, advantages and additional objects of the present invention will become manifest to those versed in the art upon making reference to the detailed description which follows and the accompanying sheets of drawings in which preferred structural embodiments incorporating the principles of the present invention are shown by way of illustrative example only.

BRIEF DESCRIPTION OF THE DRAWINGS

FIG. 1 is a cross-sectional view of a hydraulic device incorporating the principles of the present invention.

FIG. 2 is an end elevational view of the device shown in FIG. 1.

FIG. 3 is a top plan view of the device shown in FIG. 1.

FIG. 6 is a cross-sectional view of shaft members taken along line VI-VI of FIG. 1.

FIG. 7 is an elevational view of certain internal parts and is taken along line VII-VII of FIG. 1.

DESCRIPTION OF THE PREFERRED EMBODIMENT

Figure 4:
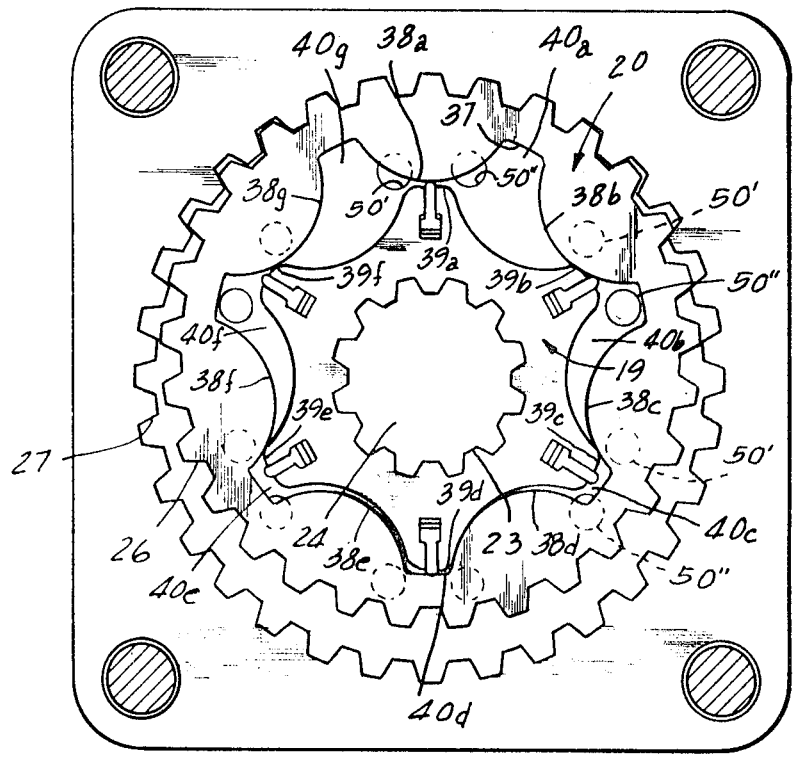
FIGS. 4 and 5 are cross-sectional views taken along lines IV-IV and V-V, respectively, shown in FIG. 1.

The principles of the present invention are applicable in any hydraulic device incorporating a pair of hypocycloidal gear members forming expanding and contracting fluid chambers or pockets between the teeth thereof and further incorporating a movable commutator valve associated with the gear members for providing face-to-face commutation or direction of fluid into and out of the expanding and contracting pockets in timed relation to the relative movement of the gear members.

In hydraulic devices of this general description the inner gear member, which has a series of external teeth formed thereon, may be conveniently referred to as a rotor, and the outer gear member, which surrounds the inner gear member and which has internal teeth formed thereon (usually one tooth more than the number of teeth formed on the rotor), may be conveniently referred to as a stator. In all such devices the rotor and the stator orbit and rotate relative to one another. In some arrangements, however, the rotor is stationary and the stator both orbits and rotates. In other arrangements the stator remains stationary and the rotor orbits and rotates. Still other arrangements utilize different movements of the rotor and stator, but in all instances there exists both relative orbital and rotational movement between the rotor and the stator regardless of which of the two gear members moves and regardless of the extent of the orbital and rotational movement of each member.

In the hydraulic device illustrated herein the rotor rotates on a fixed axis and the stator rotates about an orbiting axis of rotation and orbits about an axis which coincides with the axis of rotation of the rotor. The axis about which the orbitally moving gear member orbits may be conveniently referred to as the central axis of movement.

The principles of the present invention are applicable to any hydraulic device having inner and outer relatively orbitally and rotationally movable gear members. In such devices the gear members as well as the commutator valve are disposed within a housing having a pair of ports for directing fluid to and from the gear members. Some devices are utilized primarily as hydraulic motors or pumps, in which event the direction of fluid flow to and from the gear members is controlled by means external to the housing. Other such hydraulic devices include directional control valves within the housing for controlling the direction of the fluid to and from the gear members. Devices of the latter description may be conveniently referred to as hydrostatic devices and devices of both the former and latter descriptions may be advantageously utilized in hydraulic power steering systems and the like.

The hydraulic device illustrated herein may be referred to as a hydrostatic device since it incorporates a fluid directional control valve as well as a commutator valve, but it should be understood that the principles of the present invention are applicable to the above-described hydraulic pumps and motors as well.

Referring to the drawings, a hydraulic device incorporating the principles of the present invention is indicated generally at reference numeral 10 and includes a housing 11 having an end wall 11a and a top wall 11b in which are provided a fluid inlet port 12, a fluid outlet port 13 and a pair of working ports 14 and 15. The fluid inlet port 12 may be connected to a main fluid pump and is therefore further identified by the reference character P. The fluid outlet port 13 may be connected to the suction or return side of the main fluid pump and is therefore further identified by the reference character R. The working ports 14 and 15 may be connected to the opposite ends of a hydraulic cylinder for controlling the operation thereof and are therefore also identified respectively by reference characters C and $C_1$.

Formed within the housing 11 are a pair of generally cylindrical chamber walls 16 and 17 having aligned axes. Disposed within chamber wall 16 is an axially shiftable directional control valve 18 and disposed within chamber wall 17 is a pair of hypocycloidal gear members including an externally toothed rotor 19 and an internally toothed stator 20. Also disposed within chamber wall 17 in axially offset relation with respect to the gear members 19 and 20 is a commutator valve 21, a spacer plate 22 being interposed between the commutator valve 21 and the gear members 19 and 20. A plurality of threaded rods as at 25 are utilized to maintain the various components in assembled relation.

As shown in FIG. 4, the rotor 19 is splined as at 23 on a shaft 24 for joint rotation therewith on a stationary axis. The stator 20 is arranged to both orbit and rotate by virtue of gear teeth 26 formed on the periphery thereof and disposed in meshing engagement with cooperating stationary gear teeth 27 formed on the chamber wall 17.

The shaft 24 is axially aligned with another shaft $24_a$ also journaled for rotation in the housing 11 on a fixed axis. An outer end 26 of shaft $24_a$, which may be referred to as an operating shaft, is splined at 27 to receive a suitable operating control member such as, for example, a steering wheel or the like in instances wherein the device 10 is being used in a hydraulic power steering system.

The operating shaft $24_a$, which is restrained against axial movement, is connected to the axially shiftable and rotatable commutator valve 21 so that relative rotation therebetween has the effect of shifting the valve 18 axially along the chamber wall 16 from a neutral position (the position thereof shown in FIG. 1) to either of two operating positions, the direction of shifting of the valve 18 depending upon the direction of rotation of the operating shaft $24_a$.

In order to provide axial shifting of the directional control valve 18 a pin 28 is disposed at one end thereof in a cylindrical recess 29 formed in the valve 18 and extending radially therethrough and at an opposite end in an elongated slot 30 which, as shown in FIG. 7, is disposed at an angle with respect to the axis of rotation of the operating shaft $24_a$, which axis coincides and is aligned with the axis of rotation of the directional control valve 18, the shaft 24 and the rotor 19.

In order to control the direction of the flow of pressurized fluid from the main power pump to the gear members 19 and 20 (which controls the direction of relative movement of gears 19 and 20) by virtue of the direction of rotation of the operating shaft $24_a$, the chamber wall 16 and the directional control valve 18 have a series of axially spaced circumferentially continuous annular grooves formed therein in cooperating relationship with one another. As viewed in FIG. 1 the annular grooves formed in the chamber wall 16 are indicated respectively at reference characters P, $M_1$, C, $C_1$, M, $P_1$ and R. The grooves P, C, $C_1$ and R are, through suitable internal flow passages, connected in fluid communication to ports 12—15 respectively, indicated in FIG. 3. Groove $M_1$ communicates with one end of an internal passage 31, which passage terminates at an opposite end at a port 32 formed in a radial wall 33. The wall 33 comprises one end of the chamber 17.

The groove M communicates with one end of an internal passage 34, the other end of which terminates at a port 36 also formed in the radial wall 33.

Referring to FIG. 4, it is noted that the stator 20 has formed on an inner wall 37 thereof a plurality of internal lobes or teeth indicated respectively at reference characters $38_a$—$38_g$ which exceed by one a number of external lobes indicated at $39_a$—$39_f$ formed on the rotor 19. Between the internal teeth $38_a$—$38_g$ of the stator 20 are formed a series of fluid chambers or pockets indicated at $40_a$—$40_g$.

As a result of the difference between the number of internal teeth $38_a$—$38_g$ formed on the stator 20 and the number of teeth $39_a$—$39_f$ formed on the rotor 19, rotation of the rotor 19 on its stationary axis through one-sixth revolution causes the stator 20 to orbit completely about the axis of the rotor 19. Furthermore, as a result of a difference in the number of teeth 26 formed on the stator 20 and the number of teeth 27 formed on the chamber wall 17 the stator 20 will also rotate about its central axis one-sixth revolution each time that its central axis orbits once about the axis of rotation of the stator 19.

Furthermore, for each one-sixth revolution of the rotor 19 each of the fluid pockets $40_a$—$40_g$ is fully contracted and expanded. The expansion and contraction of fluid pockets $40_a$—$40_g$ provides the pumping, motor driving or metering effect of the gear members 19 and 20.

The purpose of the commutator valve 21 is to direct high-pressure fluid into the expanding ones of the fluid pockets $40_a$—$40_g$ and to direct low-pressure fluid from the contracting pockets when the gear members 19 and 20 are being utilized as a motor and to direct low-pressure fluid into the expanding pockets and high-pressure fluid from the contracting pockets when the gear members 19 and 20 are being utilized as a fluid pump. In either event the fluid must be directed into and out of the expanding and contracting pockets $40_a$—$40_g$ in timed relation to the rotational and orbital movement of the gear members 19 and 20, and for this reason the commutator valve 21 as well as the spacer plate 22 are splined respectively at 41 and 42 to the shaft $24_a$ for joint rotation therewith as well as with the rotor 19.

Figure 5:
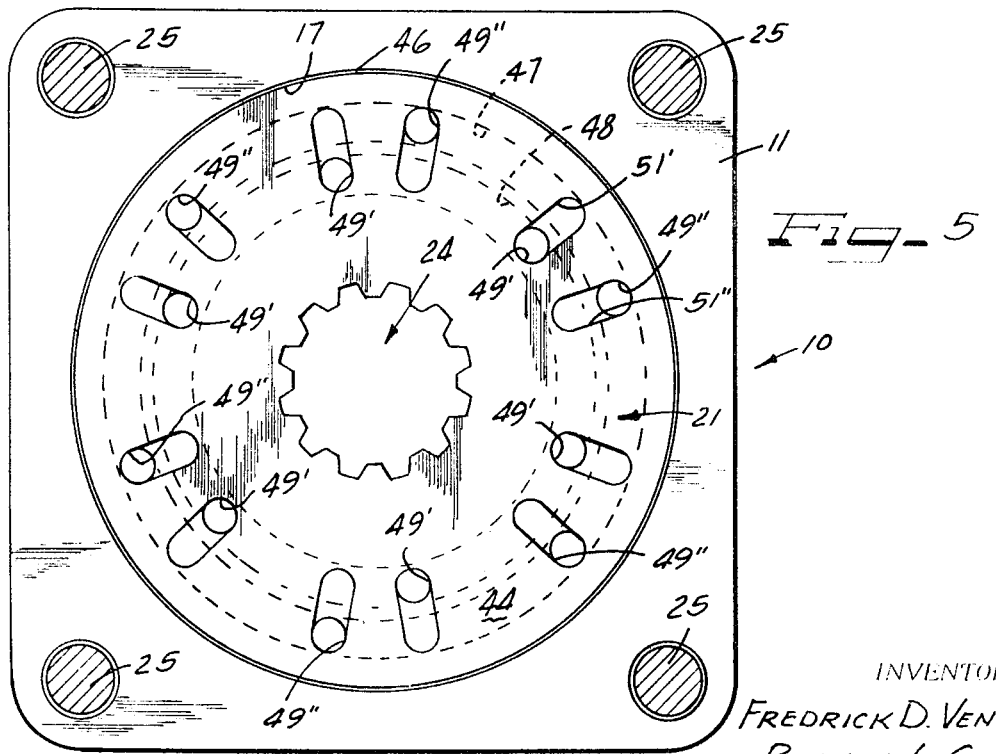

Referring to FIGS. 1 and 5, the commutator valve 21 is generally disc shaped and comprises a pair of flat radial end walls 43 and 44 which are interconnected at the outer periphery of the valve by a wall 46. Formed in the radial wall 43 are a pair of annularly shaped grooves 47 and 48 which extend in concentric relation completely about the axis of the commutator valve 21. The annular groove 47, by virtue of the location of port 36, is in constant open communication with internal passage 34, whereas the annular groove 48, by virtue of the location of the port 32, is in constant fluid communication with the internal passage 31.

Extending axially through the commutator valve 21 are a series of flow passages indicated at reference numeral 49'. The passages 49' are arranged in angularly spaced relation about the axis of rotation of valve 21 and are disposed in a generally circular pattern having a diameter approximately equal to the center diameter of the angular groove 48. Another series of axial passages 49'' are also formed in the commutator valve 21 in angular relation to each other and in angularly offset relation to the passages 49'. The diameter of the circular pattern in which passages 49'' are generally disposed is approximately equal in diameter to the center diameter of the annular groove 47.

The fluid passes from the commutator valve 21 to the pockets $40_a$—$40_g$ through the spacer plate 22 and to that end the spacer plate 22 is provided with a first series of axial passages 50' which are disposed in radial angular alignment with passages 49', and a second series of passages 50'' which are disposed in radial angular alignment with the passages 49''. The passages 50' and 50'' are both arranged in a circular pattern having a common diameter. As the stator 20 orbits through one complete cycle the teeth $38_a$—$38_g$ uncover and cover the passages 50' and 50'' in timed relation to the movement of the stator 20 as a result of which pressurized fluid is directed into only the expanding pockets $40_a$—$40_g$ when the gear members 19 and 20 are being utilized as a motor, and only from the contracting pockets when the gear members 19 and 20 are being utilized as a pump.

The passages 50' and the spacer plate 22 are each in constant fluid communication with a corresponding one of the passages 49' formed in the commutator valve 21 and the passages 50'' are each in constant communication with a corresponding passage 49''. Since the diameter of the circle on which the axes of the passages 50' and 50'' is different from the diameters of the circle about which the passages 49' and 49'' are arranged a series of recesses or depressions 51' are formed in the radial wall 44 of the commutator valve 21 to communicate each passage 49' with its corresponding passage 50', and a second series of radially extending recesses or depressions 51'' interconnect each of the passages 49'' with its respective passage 50''.

The illustrated embodiment of a hydraulic device incorporating the principles of the present invention finds particular utility in the field of hydraulic power steering systems and for that reason the operation of the device 10 will be explained as the same may be utilized in a power steering system for vehicles or the like.

The fluid inlet port 12 (FIG. 3) is connected to a main fluid power pump, and thus the grooves P, P are in communication with high-pressure fluid. In the neutral position of the directional control valve 18, as shown in FIG. 1, both of the grooves P, P are blocked off, thereby precluding fluid flow into the commutator valve 21 and to the gear members 19 and 20.

Assume that the operating shaft $24_a$ is turned in a clockwise direction when facing the device 10 from the right end thereof as viewed in FIG. 1. This rotation of the shaft $24_a$ has no effect on shaft 24 since the two are separated from one another at respective end walls 52 and 53 thereof. Nor will such rotation of the operating shaft $24_a$ have the effect of rotating the directional control valve 18, since the valve 18 is splined at 54 to the shaft 24 for joint rotation therewith.

Clockwise rotation of shaft $24_a$, however, does have the effect of shifting the control valve 18 axially leftwardly as viewed in FIG. 1 by virtue of the pin 28 riding in the helical groove 30. As the directional control valve 18 shifts axially leftwardly the leftward groove P is brought into fluid communication with groove $M_1$ through a circumferentially continuous groove 56 formed in the periphery of the valve 18. High-pressure fluid is thus directed to the annular groove 48 formed in the commutator valve 21 and thence through the axial passageways 49', the radial depressions 51' and the axial passages 50' to the expanding ones of the pockets $40_a$—$40_y$ formed between the teeth of the rotor 19 and the stator 20.

As a consequence the rotor 19 turns in a direction corresponding to the direction of rotation of the operating shaft 24. This has the effect of rotating the directional control valve 18 in a clockwise direction, but as long as the rotation of the operating shaft $24_a$ is advanced beyond the rotation of the directional control valve 18, the valve 18 will be maintained in an axially leftwardly shifted position to maintain communication of the high-pressure fluid with the gear members 19 and 20 and to maintain rotation of the rotor 19 and the valve 18.

The fluid being expelled from the contracting ones of the pockets $40_a$—$40_y$ is directed through the axial passages 50", the depressions 51" and the axial passages 49" to the internal passage 34 and thence to the groove M. The groove M, however, is now in fluid communication with the groove $C_1$ by virtue of a circumferential groove 57 formed in the periphery of the valve 18.

The fluid being delivered to $C_1$ is directed to the working port 14 (FIG. 3) and thence to one end of a hydraulic cylinder for operating the vehicular steering linkage or the like. Fluid from the opposite end of the cylinder is directed to the working port 15 and thence to the groove C. Another groove 58 formed in the directional control valve 18 communicates with the groove C and directs the fluid through a passageway 59 extending radially through the valve 18 and thence to a hollow chamber 60 formed in the operating shaft 24, through a chamber 61 surrounding one end of the valve 18 and thence to groove R. From groove R the fluid is directed to the return port 13 (FIG. 1) which is connected to the suction or return side of the main power fluid pump.

Upon termination of rotation of the operating shaft $24_a$ the gear members 19 and 20 continue to operate until the directional control valve 18 has turned sufficiently relatively counterclockwise with respect to the operating shaft 24 to cause the valve 18 to shift rightwardly as viewed in FIG. 1 back to the neutral position thereof, thus blocking off the leftwardly disposed one of the grooves P. In order to move the valve 18 completely back to the neutral position thereof a slender torsion rod 62 is connected fast at one end 63 to the operating shaft $24_a$ for joint rotation therewith and is connected fast at an opposite end 64 to the shaft 24 for joint rotation therewith. The torsion rod 62 ensures that the control valve 18 is returned to the neutral position thereof after rotation of the operating shaft $24_a$ has ceased, regardless of the direction in which the operating shaft $24_a$ was rotating.

Rotation of the operating shaft $24_a$ in a counterclockwise direction has the effect of operating the device 10 in an opposite direction. For example, when the operating shaft $24_a$ is turned in a counterclockwise direction the valve 18 is shifted rightwardly as viewed in FIG. 1, thereby communicating the rightwardly disposed high-pressure groove P with the groove M through the circumferential groove 57 formed on the commutator valve 18. As a result the internal passage 34 communicates with the high-pressure fluid and directs it through the commutator valve 21 on the spacer plate 22 into the pockets $40_a$—$40_y$ to rotate the rotor 19 in a counterclockwise direction. The fluid from the contracting pockets flows through the axial passages 50', the recesses 51' and the passages 49' to the internal passageway 31 and thence to the groove $M_1$.

From the groove $M_1$ the fluid flows through groove 56 into the groove C, thence to the working port 14 to one side of the hydraulic cylinder or the like to which the device 10 is hydraulically connected. Fluid from the other side of the hydraulic cylinder flows through the working port 15 to groove $C_1$ and thence to the groove R via groove $50_a$, radial passage 59, the hollow 60 of the operating shaft $24_a$ and the annular passage 61 surrounding the rightward end of the valve 18. From the groove R, of course, the fluid flows back to the suction or return side of the main power fluid pump.

In the event of failure of the main power fluid pump, rotation of the operating shaft $24_a$ will still have the effect of controlling the operation of the hydraulic cylinder to which the device 10 is connected. To that end the shafts 24 and $24_a$ comprise axially overlapping radially extending walls 66 and 67 which, under normal operation when the main power fluid pump is working, are maintained in spaced relation, but which under manual operation abut one another upon rotation of the operating shaft $24_a$. Thus, under manual operation, rotation of the operating shaft $24_a$ has the effect of axially shifting the control valve 18 and physically rotating the shaft 24 and the rotor 19 by virtue of the driving engagement of the abutment walls 66 and 67. Under manual operation, of course, the grooves P, P are not connected to high-pressure fluid, but instead the pressurization of the fluid is developed through the operation of the gear members 19 and 20 by virtue of the rotation of the shafts $24_a$ and 24.

In order to increase the operating life of the commutator valve 21 and to increase the overall efficiency of the hydraulic device 10 the present invention contemplates the provision of means for maintaining the commutator valve 21 in an axially balanced condition.

It will be appreciated that the pressure of the fluid in the annular groove 47 of the commutator valve 21 is at a level different from the level of pressure of the fluid in the annular groove 48, regardless of the direction of rotation of the commutator valve 21 and the rotor 19. The fluid pressure in both grooves 47 and 48, however, tends to apply a leftward force to the commutator valve 21 as it is viewed in FIG. 1, since bottom walls $47_a$ and $48_a$ of the grooves 47 and 48 serve as motive surfaces against which the fluid acts.

To overcome and balance this leftward axial force the radially extending depressions 50' and 50" formed in the radial wall 44 of the commutator valve 21 are constructed and arranged so that the pressure of the fluid acting in a rightwardly direction on backwalls $50'_a$ and $50'_a$, which backwalls also serve as motive surfaces, balances and cancels out the effects of the forces acting in a leftwardly direction.

To this end the total area of the backwalls $50'_a$ of all of the depressions 50' equals or is substantially equal to the total area of the backwall $48_a$ of the annular groove 48. Correspondingly the total area of the backwalls $50"_a$ of all of the radial depressions 50" is equal or substantially equal to the total area of the backwall $47_a$ of the annular groove 47.

If all of the depressions 50' and 50" are identical in configuration and the areas of the backwalls $50'_a$ and $50"_a$ are equal, then the radial dimensions of the backwalls $47_a$ and $48_a$ may vary as a function of the difference between the central diameters of the grooves 47 and 48 in order to provide for an axially balanced condition of the valve 21. The sizes of the radial depressions 50' and 50" may also be varied to provide optimum axial hydraulic balance of the valve 21.

Although minor modification might be suggested by those versed in the art, it should be understood that we wish to embody within the scope of the patent warranted hereon all such modifications as reasonably come within the scope of our contribution to the art.

We claim as our invention:

1. A hydraulic device comprising
a housing having fluid inlet and outlet ports therein,
a pair of gear members disposed in said housing for orbital and rotational movement relative to one another about an axis of relative movement and including an externally toothed member and an internally toothed member surrounding said externally toothed member and in meshing engagement therewith to provide expanding and contracting pockets between the teeth of said gear members, and
means including a commutator valve movable about said axis in timed relation to the movement of said gear members for communicating said inlet port with said expanding pockets and said outlet port with said contracting pockets,
said commutator valve having a pair of axially spaced radially extending walls, a first and second series of fluid passages extending axially between said walls for directing fluid to and from said expanding and contracting pockets, respectively, and first and second recess means formed in both said walls and communicating respectively with said first and second series of flow passages,
said recess means being constructed and arranged so as to hydraulically axially balance said commutator valve.

2. The invention as defined in claim 1, wherein each of said first and second recess means further comprises an annular groove formed in and opening to one of said commutator valve walls and a series of individual angularly spaced depressions formed in and opening to the other of said commutator valve walls.

3. The invention as defined in claim 1, wherein said first and second recess means comprise a pair of concentrically arranged annularly shaped circumferentially continuous grooves formed in and opening to one of said commutator valve walls.

4. The invention as defined in claim 3, wherein said first and second recess means further comprise a plurality of individual angularly spaced depressions formed in and opening to the other of said commutator valve walls.

5. For use in a hydraulic device including a pair of hypocycloidally arranged gear members one of which is mounted for rotation on a fixed axis and the other of which is arranged for orbital movement about the axis of the first for providing alternately expanding and contracting pockets between the teeth of the gear members, a commutator valve arranged for rotation about the axis of the rotating gear member and in timed relation therewith for directing fluid into and out of said expanding and contracting pockets comprising
a disc-shaped member having a central axis and a pair of flat radial walls,
a first series of individual flow passages arranged in a circular pattern around the axis of said valve and extending axially therethrough, a second series of axially extending flow passages arranged in a circular pattern and in concentric relation to said first series,
first and second annular grooves formed in and opening to one of said radial walls and arranged in concentric relation with each other to communicate respectively with said first and second series of flow passages, and
a first and a second series of individual angularly spaced depressions formed in and opening to the other of said radial walls, each of which depressions communicates with one of said flow passages in its correspondingly numbered series of flow passages, the total area of the axially facing motive surfaces in each of said series of depressions being substantially equal to the total area of the oppositely facing motive surface of its correspondingly numbered annular groove thereby to balance the commutator valve hydraulically in an axial direction.

6. The invention as defined in claim 5 wherein said depressions are elongated in a radial direction.

7. The invention as defined in claim 6, wherein said depressions all extend radially about the axis of said valve and wherein the radially inner and outer ends of said depressions comprise respectively a locus of points residing in a pair of concentric circles circumscribed on said other radial wall.

8. The invention as defined in claim 6, wherein said first and second series of depressions are disposed in alternating relation about the axis of said commutator valve.

9. A hydraulic device comprising
a housing having a high-pressure fluid inlet port and a low-pressure fluid outlet port,
gear means including a pair of hypocycloidal gear members in said housing arranged for relative rotational and orbital movement to provide expanding and contracting pockets between the teeth thereof, and
means communicating said pockets with said ports in timed relation with the movement of said gear members and including a commutator valve connected in driven relation with said gear means,
said commutator valve having a central axis, a pair of radial walls, fluid flow passages extending axially therethrough and means forming recesses in said radial walls at least one of which in each of said radial walls is subjected to high-pressure fluid and another of which is subjected to low-pressure fluid,
said recesses being constructed and arranged so as to provide a hydraulic balance to said commutator valve in an axial direction.

10. A hydraulic device comprising
a housing having a fluid inlet port and a fluid outlet port therein,
gear means in said housing including a pair of gear members arranged for relative rotational and orbital movement to provide sequentially expanding and contracting fluid pockets between the teeth thereof,
means in cooperative operating association with said gear means for directing fluid between said ports and said fluid pockets and including
a disc valve drivingly connected to said gear means for movement in timed relation therewith and having a central axis and first and second spaced radial end walls, means in said housing forming a pair of cooperating spaced radial walls in sealing engagement with said first and second end walls of said valve,
means forming passages in said housing for communicating said first and second end walls of said valve with said ports and with said pockets, respectively, and means forming axial passages through said valve and recesses in said first and second valve end walls for communicating fluid through said valve,
said recesses being constructed and arranged so as to provide a substantial hydraulic balance to said valve in an axial direction.

11. The invention as defined in claim 10 wherein the motive area of the recesses in said first valve end wall is substantially equal to the motive area of the recesses formed in said second valve end wall.

12. The invention as defined in claim 10 wherein one of said gear members and said valve rotate about aligned and stationary axes.

13. The invention as defined in claim 10 wherein one of said gear members rotates on a stationary first axis, the other gear member orbits about said first axis and rotates about a second orbiting axis and said valve rotates on said first axis in unison with said one of said gear members.

14. The invention as defined in claim 10 and including an apertured discsshaped spacer plate interposed between said gear members and said valve for directing fluid between said valve and said pockets, the orbiting one of said gear members serving to open and close said apertures in timed relation with the movement of said gear members.

15. The invention as defined in claim 10 wherein said cooperating radial wall in sealing engagement with said first valve end wall is stationary.

16. A hydraulic device comprising a housing having a central axis, a fluid inlet port, a fluid outlet port and a pair of radial walls forming in part a cylindrical chamber, a pair of hypocycloidal gerotor gears in said housing, and means communicating said ports with the expanding and contracting pockets formed between the teeth of said gerotor gears and including means forming passages in said housing opening to said radial walls, a disc valve disposed in said chamber between said radial walls and connected for synchronous movement to said gerotor gears and having radial end walls in engagement with said radial walls of said chamber, means forming passages in said valve extending axially therethrough, and means forming recesses in said radial walls in communication with said axial passages and with fluid flowing between said gerotor gears and said ports for hydraulically balancing said valve in an axial direction.